No. 12,476. REISSUED MAY 1, 1906.
C. L. DAVIS.
MECHANICAL MUSICAL INSTRUMENT.
APPLICATION FILED MAR. 24, 1905.
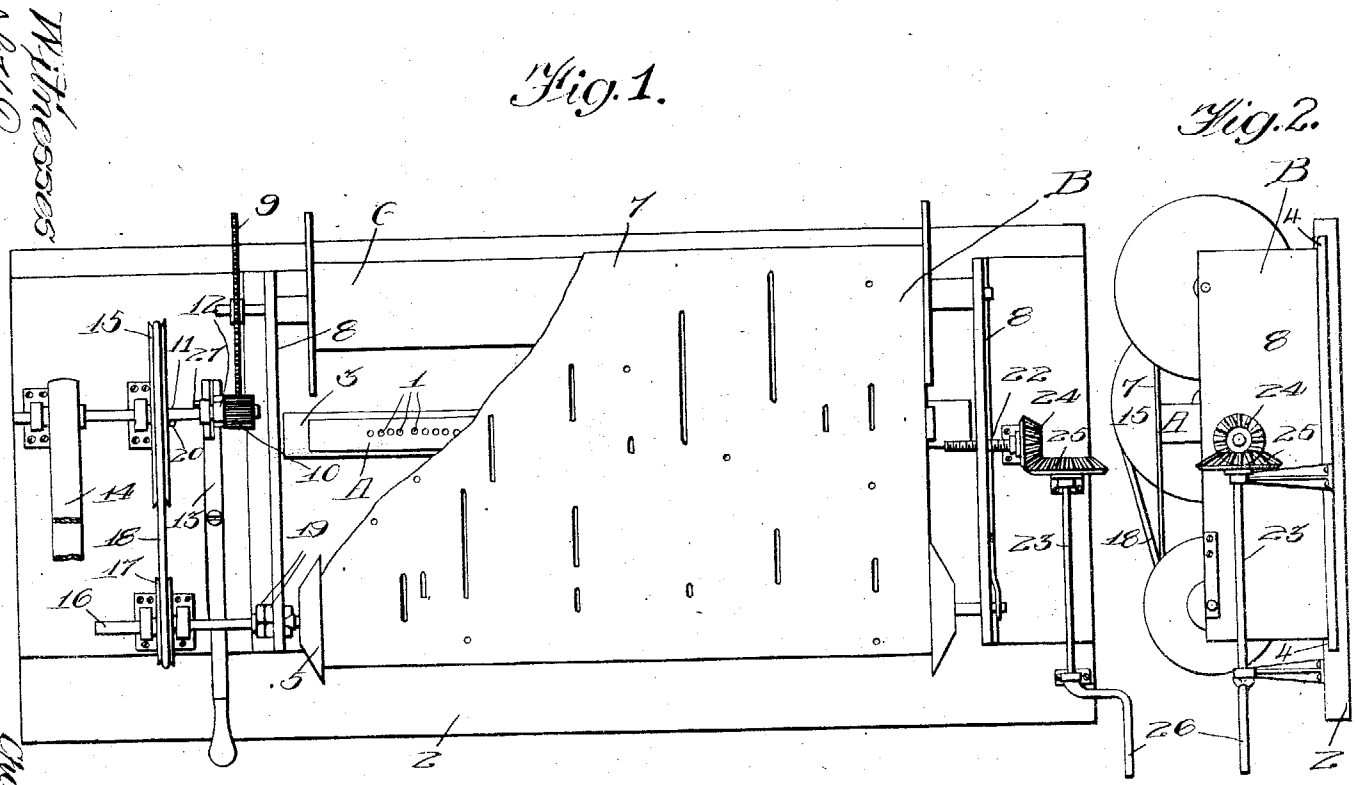
Witnesses
G. V. Donaldson
J. C. Lee
Inventor
Charles L. Davis
by Miller Peffield
Attys.

BEST AVAILABLE COPY

UNITED STATES PATENT OFFICE.

CHARLES L. DAVIS, OF DETROIT, MICHIGAN, ASSIGNOR, BY MESNE ASSIGNMENTS, TO THE AUTOPIANIST CO., OF CHICAGO, ILLINOIS, A CORPORATION OF ILLINOIS.

MECHANICAL MUSICAL INSTRUMENT.

No. 12,476. Specification of Reissued Letters Patent. Reissued May 1, 1906.

Original No. 725,941, dated April 21, 1903. Application for reissue filed March 24, 1905. Serial No. 251,893.

*To all whom it may concern:*

Be it known that I, CHARLES L. DAVIS, a citizen of the United States, residing at Detroit, in the county of Wayne and State of Michigan, have invented a certain new and useful Improvement in Mechanical Musical Instruments, of which the following is a full, clear, concise, and exact description, reference being had to the accompanying drawings, forming a part of this specification.

My invention relates to mechanical musical instruments, and in particular to mechanical piano-players—that is to say, to instruments by which a piano can be automatically played. In these mechanical piano-players of the kind to which this invention relates there are a series of operating-fingers so arranged and supported as to lie in position over the keys of the piano-keyboard. Each of these fingers is controlled by a pneumatic or bellows, so that by the operation of such pneumatic or bellows a finger will be depressed, so as to strike against and operate one of the piano-keys. The various pneumatics or bellows are arranged in the body of the piano-player and are controlled by a series of wind pipes or tubes running from such pneumatics to a tracker-board having a series of apertures or ports, each one of the tubes being extended between one of the bellows or pneumatics and one of the ports of the tracker-board. The tracker-board is usually arranged at the top of the instrument, and a traveling sheet of music is drawn or advanced across this tracker-board by suitable mechanism, usually consisting of a couple of rolls, from one of which the music-sheet is unwound and upon the other of which it is wound. The music-sheet is provided with a series of apertures or perforations which register with the various ports of the tracker-board at predetermined times and for predetermined intervals. As a general rule the air is exhausted normally from the pipes or tubes leading to the various pneumatics, and these pneumatics are arranged so as to operate upon the admission of air into the corresponding tracker-board ports. When, therefore, an aperture registers with one of the tracker-board ports, the corresponding pneumatic is actuated by the admission of air through that aperture and into that port in such a way as to cause the operation of the corresponding piano-key. In this way the playing of the piano is accomplished, the various apertures on the traveling sheet of music being so arranged as to cause the operation of the proper piano-keys at the proper times for playing various compositions.

My present invention relates in particular to the mechanism by which the traveling sheet of music is drawn across the tracker-board.

The principal objects of the invention are to provide a simple and thoroughly practical arrangement by which the traveling music-sheet can be properly advanced and can also be easily and quickly rerolled or rewound upon its original spool after it has been played.

The invention also contemplates as an object the arrangement of this form of mechanism in such a way that the traveling sheet of music can be adjusted laterally or transversely to its direction of travel, so as to permit its being adjusted to secure the proper registration of its perforations with the corresponding tracker-board ports and also to permit of its being shifted sufficiently to permit the key in which the composition is being played to be changed.

In the accompanying drawings, Figure 1 is a plan of the music-sheet-controlling mechanism of a mechanical piano-player embodying my invention. Fig. 2 is an end view of the same.

In the music-sheet-controlling mechanism illustrated in the drawings for the purpose of setting forth my invention I have shown a tracker-board A, which is understood to be suitably connected and mounted in the mechanical piano-player or other musical instrument in which the invention is embodied. This tracker-board A is the usual form of board, consisting of a wooden board mounted on edge and provided with apertures or ports 1 1, extending crosswise of the board and communicating with suitable tubes which are understood to be extended to the pneumatics. The top of the piano-player is provided with a base-piece 2, which is secured to the player and forms a rigid support for the tracker-board. This base-piece 2 is mounted in such a way that the tracker-board A projects up through it near its lon-

BEST AVAILABLE COPY gitudinal middle. Arranged upon the base-piece 2 is a support or carrier B, which has an opening 3, through which the tracker-board projects, the said support or carrier B being superposed upon the base-piece 2 and corresponding substantially with the same in general shape and size. The carrier B is arranged for movement relatively to the tracker-board A in a direction lengthwise of the board, the base-piece 2 being to such end provided with guides 4 4, in which the edges of the support or carrier B can travel. The opening 3 is made sufficiently long to permit the movement of the carrier B without interfering with the tracker-board. The roll upon which the music-strip is carried is represented at 5, and the roll upon which it is wound is represented at 6. The music-sheet 7 is shown in the drawings as being drawn across the tracker-board A by being wound upon the roll 6 and unwound from the roll 5. The rolls 5 and 6 are mounted upon the movable carrier B on opposite sides of the tracker-board and parallel with such board, in which way a movement of the carrier B in a direction lengthwise of the tracker-board shifts the rolls 5 and 6 simultaneously in a direction transversely to the direction of movement of the traveling music-sheet. The mounting for the rolls 5 and 6 as shown consists of a pair of struts 8 8, secured to the shifitable carrier B on opposite sides of the end of the tracker-board. It is understood, of course, that the roll 5 is placed upon its mountings in a full condition and is removed after the music-sheet has been unwound from it and then again wound upon it. To such end the mounting for the roll 5 is such as will allow the withdrawal of such roll and the substitution of another, the usual spring-clasp for this purpose being shown at the right-hand end of the roll. The roll 6 is rigidly mounted in the struts 8 8. The shifting of the carrier B to shift the traveling music-sheet laterally to its direction of travel is to permit the perforations in the music-sheet to be brought properly into register with the corresponding ports of the tracker-board to permit the keys of the composition represented by the sheet of music to be changed by causing the perforations to register with another set of ports in the tracker. This shifting of the movable carrier B is accomplished in the arrangement shown by mechanism mounted at the right-hand side of the device, referring to fig. 2. This mechanism consists of shafts 22 and 23, arranged at right angles to one another and provided with intermeshing bevelled gears 24 and 25. Both of the shafts 22 and 23 are mounted in bearings secured to the base-piece 2. The shaft 22 is provided with a threaded portion which screws into the adjacent strut 8. The shaft 22 is provided with a handle 26, by which it can be turned by hand. The rotation of the shaft 23 by the handle 26 causes the shifting of the carrier B in one direction or the other according to the direction in which the handle 26 is turned. The roll 6 is provided with a gear-wheel 9 on the outer end of its spindle, and meshes with a pinion 10 on a rotary shaft 11, which latter is mounted stationarily upon the base-piece 2. The pinion 10 is made of considerable width so that the gear-wheel 9 will always mesh with it notwithstanding a shifting movement on the part of the carrier B. The pinion 10 is splined to the shaft 11 so that it can be shifted bodily along such shaft and it is provided with a hub portion 12. A lever 13 is pivoted to the base 2 and has its rear end in engagement with the hub portion 12 of collar 14. The rotary shaft 11 is the driving shaft for the music-controlling mechanism and is intended to be normally rotated by a suitable motor embodied in the player. A belt 15 is shown running over a pulley 16 on this shaft, it being understood to be constantly driven by the motor referred to. By such arrangement the roll 6 can be bodily driven by swinging the lever 13 to the position shown in Fig. 2, in which it causes the engagement of the pinion 10 with the gear-wheel 9, and also the roll 6 can be allowed to stop by shifting the lever to such an extent as to cause the pinion 10 to become disengaged from the gear-wheel 9.

As an arrangement for causing the rolling of the music-sheet 7 after it has been drawn across the tracker-board by the rotation of the roll 6 the driving shaft 11 is provided with a pulley 15 and a supplemental rotary shaft 16, having bearings which are mounted upon the base-piece 2 is connected with the socket in which the left-hand end of the roll 5 fits. The shaft 16 is provided with a pulley 17, and a belt 18 is extended over the pulleys 15 and 17. The pulley 17 is splined upon the shaft 16, and this shaft is held by the struts 8 in such a way that it is incapable of longitudinal movement relatively to such struts, the arrangement shown consisting of a pair of set-screws 19 19. The pulley 15 is loose upon the shaft 11, and is provided with a pin 20, which is adapted to engage a pin 21 on the collar 12 when such collar is moved sufficiently to the left. By such arrangement when it is desired to reroll the music-sheet 7 the lever 13 is shifted to an extent to bring the pins 20 and 21 into engagement with one another, and thereby cause the pulley 15 to drive the shaft 16, and thereby turn the roll 5 in a backwardly direction. If it is simply desired to stop the roll 6 without rerolling the music-sheet, the lever 13 is shifted to such an extent as to disengage the pinion 10 and gear-wheel 9 without causing the engagement of the pins 20 and 21. The splining of the pulley 17 upon the shaft 16 is for the purpose of allowing the shaft 16 to be shifted by a shifting movement of the movable carrier B without interfering with the driving of such shaft by the pulley 17 and belt 18. It will be seen that the shifting movement of the carrier B either to cause the proper registration of the tracker-board ports and the music-sheet perforations or to shift the set of ports with which the perforations register is not interfered with by the mechanism for advancing the music-sheet, this mechanism being so arranged as to permit the lateral shifting movement of the carrier and the spools carried thereby without interfering in the least with its action. The arrangement also permits the music-sheet to be rerolled also without interfering with the mechanism by which it is shifted laterally.

It is understood that the lever 13 shuts the air off from the tracker-board ports when it is operated, so as to cause the music-sheet to be rerolled; but as such an arrangement is old and well known it is not shown or described herein.

What I claim as my invention is—

1. The combination in a mechanical musical instrument of music-rolls, a tracker-board, and means for shifting one of said rolls longitudinally and relatively to the tracker-board.

2. In a mechanical musical instrument, the combination of music-rolls, a tracker-board and means for simultaneously shifting both of said rolls longitudinally and relatively to the openings in the tracker-board.

3. In a mechanical musical instrument, the combination of music-rolls, a tracker-board, means for shifting one of said rolls longitudinally and relatively to the tracker-board, said shifting means being capable of imparting an adjusted or variable throw to the roll.

4. In an automatic musical instrument or player, in combination with a fixed tracker-board, a platform movable longitudinally with respect to the tracker-board, take-up and rewind rolls mounted on said platform, and means for moving the platform at will.

5. The combination with the tracker-board, and means for advancing the traveling music-sheet across the same, of a carrier upon which the music-sheet-advancing means is mounted, the said carrier being arranged for movement longitudinally of the tracker-board, means for shifting the carrier to either direction, gearing for driving such music-advancing mechanism, said gearing being adapted to permit the shifting movement of the carrier and the advancing means carried thereby during operation, and means for driving said gearing, substantially as described.

6. The combination with the tracker-board and means for advancing the traveling music-sheet, of a shiftable carrier arranged for movement longitudinally of the tracker-board and carrying said music-sheet-advancing means, gearing for driving said means, the said gearing being adapted to permit the shifting of the carrier and the music-sheet-advancing means carried thereby during operation, means for connecting and disconnecting said gearing at will, and mechanism for driving said gearing, substantially as set forth.

7. The combination with the tracker-board and means for advancing a sheet or strip of music across the same, of a shiftable carrier upon which is mounted the music-sheet-advancing means, the said carrier being arranged for shifting movement longitudinally of the tracker-board, a driving-shaft stationarily mounted, and gear-wheels between said driving-shaft and the music-sheet-advancing means, one of said gear-wheels being sufficiently wide to permit the shifting of the carrier and said music-advancing means without causing the disengagement of the gear-wheels, substantially as described.

8. The combination with the tracker-board and the spools for the music-sheet, said spools being arranged on opposite sides of the tracker-board, a shiftable carrier arranged for shifting movement longitudinally of the tracker-board and supporting said spools, a gear-wheel on the driven spool, a rotary driving-shaft carrying a pinion adapted to mesh with said gear-wheel, the said pinion being sufficiently wide to permit the shifting of the carrier and the music-spools without disengaging the pinion and gear-wheel, and means for driving said driving-shaft, substantially as described.

9. The combination with the tracker-board and the spools for the music-sheet, said spools being arranged on opposite sides of the tracker-board, of a shiftable carrier upon which said spools are mounted, said carrier being arranged for movement longitudinally of the tracker-board, a driving-shaft, gearing between said driving-shaft and one of said spools, the said gearing being adapted to permit the shifting of the carrier and spools without disengaging the gearing and also adapted to permit the disengagement of the gearing when desired, and means for actuating the gearing so as to cause its disengagement, substantially as described.

10. The combination with the tracker-board and a shiftable carrier arranged for shifting movement longitudinally of the tracker-board and provided with spools situated on opposite sides of the tracker-board, of a driving-shaft, gear-wheels carried by said driving-shaft and by the driven music-spool, one of said gear-wheels being sufficiently wide to permit the shifting of the carrier without causing their disengagement and the gear-wheel upon the driving-shaft being splined thereupon, and means for shifting said gear-wheel on the driving-shaft so as to cause its disengagement from the gear-wheel carried by the driven music-spool, substantially as described.

11. The combination with the tracker-board and with means for drawing the music-sheet across the tracker-board, of a carrier arranged for shifting movement longitudinally of the tracker-board, means for shifting said carrier, power-transmitting connection for actuating said music-drawing means so as to draw the music-sheet across the tracker-board in either direction, said power-transmitting connection being adapted to permit the shifting of the carrier with the music-drawing means thereon, irrespective of the direction in which the music-sheet is being drawn, substantially as set forth.

12. The combination with the tracker-board, and with spools for the music-sheet, the said spools being mounted upon opposite sides of the tracker-board, of a shiftable carrier arranged for movement longitudinally of the tracker-board and having the spools mounted upon it, means for shifting the shiftable carrier in either direction, a driving-shaft, power-transmitting connections between the driving-shaft and both of the spools whereby each spool can be driven, said power-transmitting connections being such that each can be broken to prevent the driving of the spool with which it is associated and being also adapted to permit the shifting of the shiftable carrier without causing their breakage, and means for causing the simultaneous engagement of one power-transmitting connection and disengagement of the other, and vice versa, substantially as set forth.

13. The combination with the tracker-board and with a shiftable carrier arranged for shifting movement longitudinally of the tracker-board and provided with spools situated on opposite sides of the tracker-board, a driving-shaft, gearing between said driving-shaft and one of said spools, the said gearing being adapted to permit the shifting of the shiftable support without causing its disengagement, power-transmitting connection between said driving-shaft and the other spool, said connection being adapted to permit the shifting of the shiftable carrier without causing its disconnection, means for connecting and disconnecting said gearing, and means for connecting and disconnecting said power-transmitting connection according as the gearing is disconnected or connected respectively, substantially as set forth.

14. The combination with the tracker-board and with mechanism for carrying the music-sheet, of a shiftable carrier upon which the music-carrying mechanism is mounted, means for shifting said carrier, and means for advancing and rerolling the music-sheet, both the advancing and the rerolling means being adapted to permit the shifting of the shiftable carrier without disconnecting them, substantially as described.

15. The combination with the tracker-board and with a shiftable carrier arranged for a shifting movement longitudinally of the tracker-board and provided with spools arranged on opposite sides of such board, of a driving-shaft, gear-wheels, one on said driving-shaft and one on one of said spools, one of said gear-wheels being sufficiently wide to permit the shifting of the carrier without causing the disconnection of said wheels and the gear-wheel on the driving-shaft being splined thereto, a supplemental shaft connected with the socket for holding the other spool, power-transmitting connection between said shaft and the driving-shaft, said connection being such as to permit the shifting of the carrier without disengaging such connection, a clutch for engaging and disengaging such connection, and means for simultaneously operating said clutch and shifting the gear-wheel on the driving-shaft in such a way as to connect the driving-shaft with the power-transmitting connection and to disconnect the gear-wheel on said shaft with the gear-wheel on the driven spool, and vice versa, substantially as described.

16. The combination with the tracker-board and with a shiftable carrier arranged for shifting movement laterally of the tracker-board and carrying a pair of spools, one arranged on each side of the tracker-board, means for shifting said shiftable carrier, a driving-shaft carrying a wide pinion splined to it, a gear-wheel carried by the driven roll and meshing with said pinion, a pulley mounted loosely on the driving-shaft and having a pin adapted to engage a pin on a collar on said pinion, a supplemental shaft connected with the socket for the other spool, a pulley loosely mounted on said shaft and splined thereto, and a lever adapted to shift the pinion on the driving-shaft so as to cause the disengagement of the pinion with the gear-wheel on said driven roll and the engagement of the said clutch-pins, and vice versa, substantially as described.

17. The combination with the tracker-board and with means for advancing the music strip or sheet across the board, of a shiftable carrier arranged for movement longitudinally of the tracker-board, the said advancing means being carried by said carrier, means for shifting the carrier in either direction, and power-transmitting connection for driving said advancing means in a backwardly lirection, said power-transmitting connection being adapted to permit the shifting of the shiftable carrier without disconnecting the connection.

18. The combination with the tracker-board and with a shiftable carrier arranged for movement longitudinally of the tracker-board and provided with a music-spool on the rear side of the tracker-board, of a driving-shaft carrying a loose pulley, a clutch for engaging said pulley, a supplemental shaft connected with a socket for receiving the spindle of a music-roll, a pulley splined to said shaft, a bearing for holding said pulley in alinement with the loose pulley on the driving-shaft, and means for operating said clutch, substantially as set forth.

19. The combination with the tracker-board and with a carrier shiftable longitudinally of the tracker-board and provided with a driven spool, and also with sockets for a music-spool, and with means for shifting the shiftable carrier, of a driving-shaft having a loose pulley, a clutch for engaging said pulley with said shaft, together with means for operating said clutch, a supplemental shaft connected with said socket for a music-spool and provided with means whereby it is held against longitudinal movement relatively to said socket, a loose pulley splined upon said shaft, and a bearing holding said pulley in alinement with the loose pulley on the driving-shaft, substantially as described.

20. The combination with the tracker-board, of a shifting support arranged for movement longitudinally of the tracker-board and having an aperture through which the tracker-board projects, the portions of the support being arranged in the front and rear of the tracker-board, a pair of spools, one supported on the front portion of the support and the other on the rear portion and secured thereto so as to be moved in unison by the shifting of the support, and means for shifting the support in either direction.

21. In a mechanical musical instrument, the combination with the rigidly-mounted tracker-board extending upwardly from the top of the instrument, of a flat support arranged to slide longitudinally of the tracker-board and mounted upon the top of the musical instrument, the said flat support consisting of front and rear portions arranged in the front and rear of the tracker-board and having an opening or aperture through which the tracker-board projects, a pair of spools, one mounted on the front portion and the other on the rear portion of the support so as to be moved in unison thereby, and devices for shifting said support in either direction.

22. In a transposing apparatus for musical instruments, a traveling web mounted on rollers, said rollers being journaled in a frame which has a lateral movement.

23. In a transposing apparatus for musical instruments, a traveling web mounted on rollers, said rollers being journaled in a frame which has a lateral movement, and means whereby said roller-frame may be adjusted and held at any point.

24. The combination with the tracker-board and means for advancing the traveling music-sheet, of a shiftable carrier arranged for movement longitudinally of the tracker-board and carrying said music-sheet-advancing means, and power-transmitting connections for driving said means, the said connections being adapted to permit the shifting of the carrier and the music-sheet-advancing means carried thereby during operation.

25. The combination with a tracker, of a traveling music-sheet having perforations to coöperate with ports of said tracker, and means for shifting said music-sheet longitudinally of the tracker.

26. The combination with a tracker, of a traveling music-sheet, supporting devices for carrying the music-sheet, and means for adjusting the music-sheet crosswise of its direction of movement and relatively to the tracker.

In witness whereof I hereunto subscribe my name this 13th day of January, A. D. 1905.

CHARLES L. DAVIS.

Witnesses:
GEORGE W. ALLISON,
WILLARD HATHAWAY